US008372289B2

(12) United States Patent
Gassen

(10) Patent No.: US 8,372,289 B2
(45) Date of Patent: Feb. 12, 2013

(54) METHOD FOR CONDITIONING RADIOACTIVE ION EXCHANGE RESINS

(75) Inventor: Rainer Gassen, Fürth (DE)

(73) Assignee: Areva NP GmbH, Erlangen (DE)

( * ) Notice: Subject to any disclaimer, the term of this patent is extended or adjusted under 35 U.S.C. 154(b) by 295 days.

(21) Appl. No.: 12/816,790

(22) Filed: Jun. 16, 2010

(65) Prior Publication Data

US 2010/0256435 A1 Oct. 7, 2010

Related U.S. Application Data

(63) Continuation of application No. PCT/EP2009/050415, filed on Jan. 15, 2009.

(30) Foreign Application Priority Data

Jan. 17, 2008 (DE) ......................... 10 2008 005 336

(51) Int. Cl.
*B01D 15/00* (2006.01)

(52) U.S. Cl. ....................................... 210/673; 210/682

(58) Field of Classification Search .................. 210/673, 210/682

See application file for complete search history.

(56) References Cited

U.S. PATENT DOCUMENTS

| | | | | |
|---|---|---|---|---|
| 4,437,999 | A | 3/1984 | Mayne | |
| 4,483,789 | A | 11/1984 | Kunze et al. | |
| 4,530,723 | A | 7/1985 | Smeltzer et al. | |
| 4,671,898 | A | 6/1987 | Hultgren | |
| 4,877,558 | A * | 10/1989 | Morioka et al. | 588/18 |

FOREIGN PATENT DOCUMENTS

| | | | |
|---|---|---|---|
| AT | 43561 | E | 10/1989 |
| CA | 2066741 | A1 | 2/1991 |
| DE | 3926252 | A1 | 2/1991 |
| DE | 3781984 | T2 | 2/1993 |
| DE | 602004003464 | T2 | 9/2007 |
| EP | 0124965 | B1 | 1/1988 |
| EP | 0257192 | A1 | 3/1988 |
| EP | 0522931 | A1 | 1/1993 |
| EP | 1564188 | B1 | 11/2006 |
| EP | 1786000 | A1 | 5/2007 |
| GB | 2065360 | A | 6/1981 |
| WO | 8500922 | A1 | 2/1985 |
| WO | 9203829 | A1 | 3/1992 |
| WO | 9409904 | A1 | 5/1994 |

OTHER PUBLICATIONS

International Search Report of PCT/EP2009/050415, dated Jun. 23, 2009.

* cited by examiner

*Primary Examiner* — Chester Barry

(74) *Attorney, Agent, or Firm* — Laurence A. Greenberg; Werner H. Stemer; Ralph E. Locher

(57) ABSTRACT

A method for conditioning a contaminated ion exchange resin includes mixing the contaminated ion exchange resin with water and at least partly breaking up the contaminated ion exchange resin into water-soluble components or fragments through the use of an oxidizing agent added to the water. A resulting aqueous solution is consolidated with a binder, optionally after concentration by evaporation of water.

10 Claims, No Drawings

METHOD FOR CONDITIONING RADIOACTIVE ION EXCHANGE RESINS

CROSS-REFERENCE TO RELATED APPLICATION

This is a continuation application, under 35 U.S.C. §120, of copending International Application No. PCT/EP2009/050415, filed Jan. 15, 2009, which through the use ofated the United States; this application also claims the priority, under 35 U.S.C. §119, of German Patent Application DE 10 2008 005 336.8, filed Jan. 17, 2008; the prior applications are herewith incorporated by reference in their entirety.

BACKGROUND OF THE INVENTION

Field of the Invention

The invention relates to a method for conditioning radioactive ion exchange resins. Ion exchange resins, which are as a rule present as approximately spherical particles, are used, for example in the operation of nuclear facilities, for purifying the coolant of the primary system, i.e. water. The aim of the purification is the avoidance of undesired deposits on the surfaces of the primary loop or circulation components, the avoidance of corrosion and the reduction of the buildup of contamination in the primary loop of the facility. In the purification, both acidic cation exchangers and basic anion exchangers are used, with the former retaining metal cations and the latter retaining anionic compounds, for example metal complexes. Since some of the metals are radionuclides, spent or laden ion exchangers are radioactive waste and must be transported for intermediate or final storage. Radioactively contaminated exchange resins are also obtained in the decontamination of nuclear facilities, for example in the decontamination of the primary loop. In such a method, metal oxide layers present on the surfaces of the primary loop components are detached with the aid of decontamination solutions, with the solutions being passed, during or after the decontamination, over ion exchangers in order to remove activity or metal cations present therein.

Contaminated ion exchangers, which are substantially organic resins having acidic or basic groups, must be conditioned for the final or intermediate storage. Conditioning is to be understood as meaning generally the conversion of radioactive waste into a storable form.

In the case of nuclear facilities, spent ion exchange resins are usually dried and, after a certain storage time or decay time, in which the radioactivity has fallen to a specified limit, are embedded in, for example cemented into, a solid matrix for storage. The embedding of the ion exchange resins in a solid matrix leads to an increase in volume by more than six times the resin volume. Due to the large amount of resulting waste, the operator of a nuclear power station incurs considerable costs for the intermediate or final storage. Concepts which reduce the volume of the ion exchange resins have therefore been developed. One of those concepts envisages incineration. However, that requires complicated filter units in order to prevent emergence of radioactivity into the environment. Moreover, the incineration does not function particularly well, due to the acidic or basic groups usually present in the resins. As an alternative, the metals and hence the activity are removed completely from the resins with the aid of acids or alkalis, so that the resins can be reused. The respective acid or alkali is passed over a purely organic resin, i.e. a resin which contains neither acidic nor basic groups and is therefore more easily incineratable. The resin binds the metals (and the activity) by adsorption. During the complete regeneration of the acidic or basic exchange resins, considerable amounts of acid/base are obtained as secondary waste, which has to be disposed of.

A further concept envisages complete mineralization of the exchange resins, leaving only metal salts. In such a procedure, for example disclosed in German Translation DE 60 2004 003 464 T2 of European Patent EP 1 564 188 B1, practically the total resin is oxidized into carbon dioxide and water. That requires very large amounts of oxidizing agents, such as hydrogen peroxide, and an immense outlay in terms of apparatus and process technology, in particular for the purification of the carbon dioxide present as gas.

SUMMARY OF THE INVENTION

It is accordingly an object of the invention to provide a method for conditioning contaminated ion exchange resins, which overcomes the hereinafore-mentioned disadvantages of the heretofore-known methods of this general type, with which a volume reduction is associated in comparison with direct embedding in a solid matrix and which can be carried out in a short time with the use of little material.

With the foregoing and other objects in view there is provided, in accordance with the invention, a method for conditioning a contaminated ion exchange resin, which comprises mixing the contaminated ion exchange resin with water and at least partly breaking up the contaminated ion exchange resin into water-soluble fragments with the aid of an oxidizing agent added to the water, and consolidating a resulting aqueous solution with a binder, optionally after concentration by evaporation of water.

The volume reduction achieved by the method as compared with cementing in of solid resin particles, resides mainly in the transformation from the solid phase, in which the resin is present in the form of a bulky network of macromolecules, into dissolved fragments of this network. The method substantially requires no more than one container for carrying out the resin oxidation and if need be a second container for the consolidation. The added oxidizing agent causes the polymer network of the resin, for example of a copolymer of vinylbenzene and divinylbenzene, to be broken up, with water-soluble fragments forming. The water solubility arises from acid or base groups present on the fragments (for example sulfo groups or aminoethyl groups). In order to achieve as large a volume reduction as possible, the oxidation is preferably continued until the total resin or virtually the total resin has gone into solution. The exchange resin is therefore oxidatively treated only until it is present preferably completely in the form of water-soluble fragments. The resulting amount of carbon dioxide is comparatively small. In addition to carbon dioxide, a small proportion of oxygen, which forms by autoxidation in the case of the use of hydrogen peroxide as an oxidizing agent, may also be present. If the oxidation is continued after the resin is completely present in the form of water-soluble fragments, the advantage according to the invention is achieved to a noticeably smaller extent. According to the invention, an attempt is therefore made to ensure that as large a part as possible of the carbon present in the exchange resin is present in the form of soluble molecular fragments, i.e. is not oxidized into carbon dioxide and water. According to the invention, a degree of oxidation of less than 50%, preferably of less than 20%, of the carbon content of the exchange resin is therefore envisaged. The amount required in each case can be calculated with knowledge of the carbon content of the resin and its chemical structure. Often, corresponding data of the exchange resin are not available so that the required amount of oxidizing agent can then be determined empirically by preliminary experiments. The consolidation is effected in a simple manner by stirring the mixture present at the end of the oxidation treatment with at least the same mass of cement. In addition to cement, other binders, such as waterglass, may optionally also be used. As compared with the direct binding of the untreated ion exchange resin in cement, which is mentioned further above and in which a volume increase by a factor of 6 results in comparison with the original resin bulk volume, a factor of only 2 to 4 is achieved in a procedure according to the invention—depending on the water/resin ratio present and on the water/cement value. This factor can be further reduced if a part of the water is removed by evaporation from the solution prior to consolidation.

Cement, for example Portland cement, generally contains large proportions of calcium oxide, which, in the setting process together with silicates, forms hydrates with the mixing water that bring about the hardening of the cement. If the water of the mixture to be consolidated is acidic, the calcium oxide is dissolved and is no longer available for hydrate formation and hence for the hardening of the cement. In order to prevent this, a base for neutralizing acids or for raising the pH of the mixture is added to the mixture in a preferred variant of the method, so that the mixture is weakly acidic to basic at the end. Alkaline earth metal oxides and hydroxides are preferably used as the base.

The oxidation of the ion exchange resins can be carried out in principle with any desired oxidizing agents. However, those which, in their reaction with the resin, form no reaction products which hinder the setting of the cement or of another binder, are preferably used. Hydrogen peroxide and ozone are used as oxidizing agents which have this property. Only harmless water remains of the hydrogen peroxide, and ozone is reduced to oxygen, which for the most part escapes from the mixture. $CO_2$ (which for the most part escapes) and water form in the resin oxidation.

Other features which are considered as characteristic for the invention are set forth in the appended claims.

Although the invention is described herein as embodied in a method for conditioning radioactive ion exchange resins, it is nevertheless not intended to be limited to the details given, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying examples.

DETAILED DESCRIPTION OF THE INVENTION

Referring now in detail to the invention, it is noted that the method was tested with various resins. In each case a specified resin volume (50 ml bulk volume, spherical particles, diameter about ≦1 mm) was mixed with water and 30 percent strength hydrogen peroxide (aqueous solution) was added to this mixture or ozone was passed into the mixture. Further details appear in the following table:

| Experiment No. | | Water | $H_2O_2$ | $O_3$ | Temperature | Dissolution time |
|---|---|---|---|---|---|---|
| 1 | Resin 1 | 50 ml | 25 ml | — | 80° C. | 170 min |
| 2 | Resin 1 | 50 ml | 25 ml | — | 90° C. | 40 min |
| 3 | Resin 1 | 50 ml | — | Passed-in in gaseous form | Room temperature | 60 hours |
| 4 | Resin 2 | 50 ml | 25 ml | — | 90° C. | 2 hours |
| 5 | Resin 3 | 70 ml | 40 ml | — | 90° C. | 6 hours |
| 6 | Resin 4 | 70 ml | 35 ml | — | 90° C. | 5 hours |

Resins 1 and 2 are polystyrene-based resins having a relatively low degree of crosslinking and a proportion of about 4-6% of divinylbenzene. Resins 3 and 4 are more highly crosslinked and have a proportion of about 8-12% of divinylbenzene. The experiments have shown that not all resins are equally degradable. The time required for completely dissolving more highly crosslinked resins (No. 3 and 4) is greater. The temperature is, of course, also decisive for the duration (see experiment Nos. 1 and 2). Acceleration of the oxidation can also be achieved by adding the hydrogen peroxide in higher concentration. In the case of the oxidation with ozone, the latter was passed in gaseous form into the mixture with the aid of a glass frit. With ozone, too, complete dissolution of resin 1 was achieved, but a period of 60 hours was required for this purpose. In all cases, the mixture was consolidated with cement at a water-cement mass ratio of 0.5 after complete dissolution of the ion exchange resins. The volume of the resulting hardened cement paste was about twice to three times the resin bulk volume. In all cases, the procedure was effected in alkaline solution.

The invention claimed is:

1. A method for conditioning a contaminated ion exchange resin, the method comprising the following steps:

mixing the contaminated ion exchange resin with water;

at least partly breaking up the contaminated ion exchange resin into water-soluble fragments with the aid of an oxidizing agent added to the water; and consolidating a resulting aqueous solution with a binder.

2. The method according to claim 1, which further comprises carrying out the consolidating step after concentration by evaporation of water.

3. The method according to claim 1, which further comprises using cement as the binder.

4. The method according to claim 3, which further comprises adding a base to the mixture before the consolidation with cement.

5. The method according to claim 4, which further comprises using an alkaline earth metal oxide or hydroxide as the base.

6. The method according to claim 1, which further comprises using hydrogen peroxide or ozone as the oxidizing agent.

7. The method according to claim 1, which further comprises carrying out an oxidation treatment at a temperature higher than room temperature.

8. The method according to claim 7, which further comprises carrying out the oxidation treatment at a temperature of from 80° C. to 100° C.

9. The method according to claim 1, which further comprises choosing an amount of the oxidizing agent to cause less than 50% of the carbon present in the exchange resin to be oxidized into carbon dioxide and water.

10. The method according to claim 1, which further comprises choosing an amount of the oxidizing agent to cause less than 20% of the carbon present in the exchange resin to be oxidized into carbon dioxide and water.

* * * * *